Feb. 11, 1958 J. FLUELER 2,822,893
DEVICE FOR TAKING UP BACKLASH
Filed Oct. 17, 1955 4 Sheets-Sheet 1
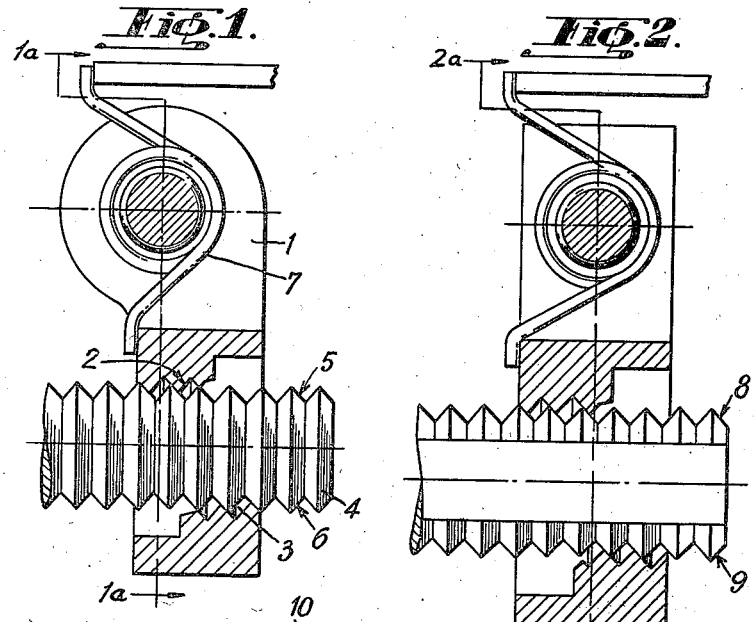
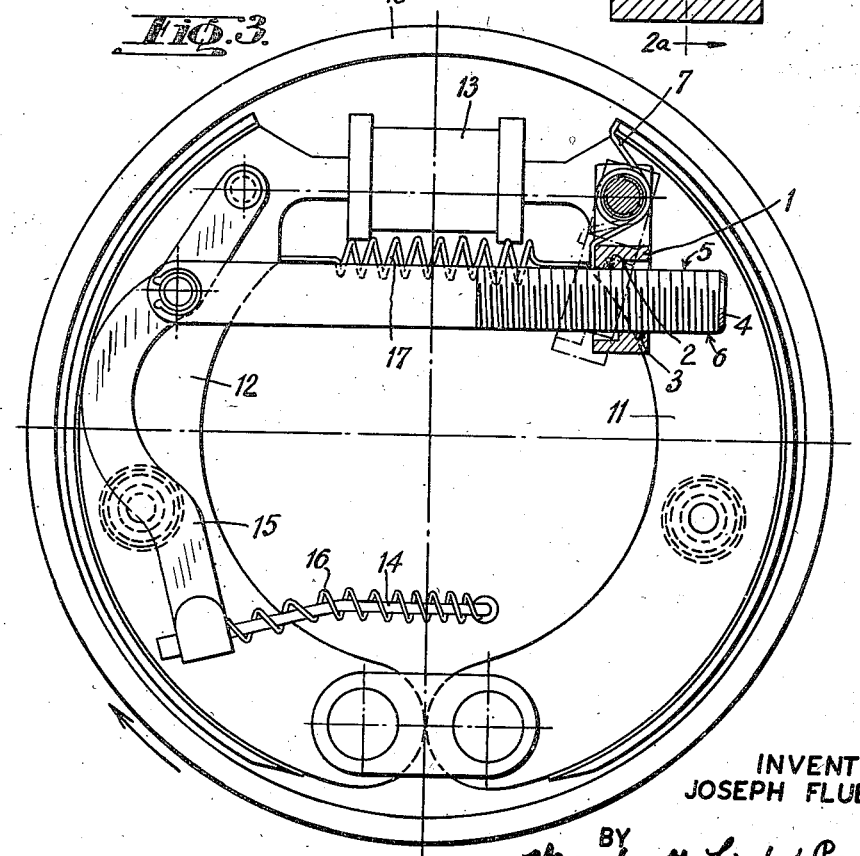
INVENTOR
JOSEPH FLUELER

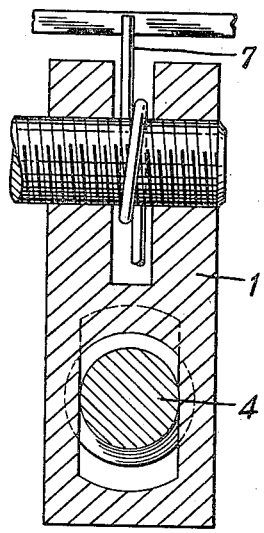
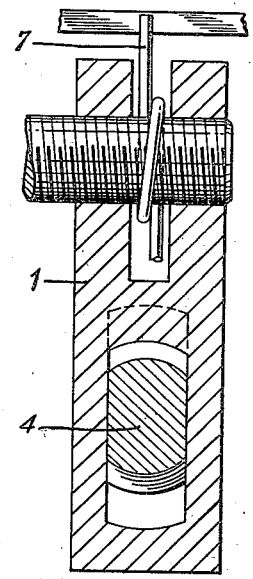
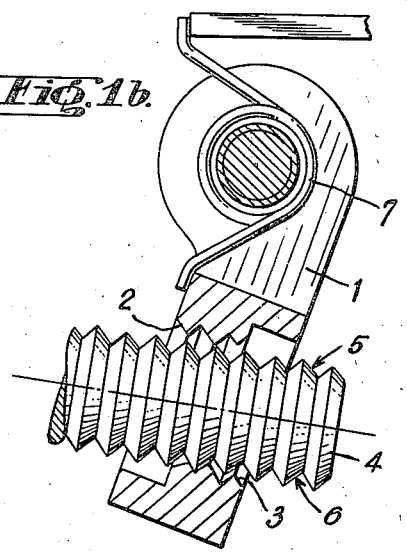

Feb. 11, 1958 J. FLUELER 2,822,893
DEVICE FOR TAKING UP BACKLASH
Filed Oct. 17, 1955 4 Sheets-Sheet 3

INVENTOR
JOSEPH FLUELER
BY
Wenderoth, Lind & Ponack
Attys.

Feb. 11, 1958　　　　　J. FLUELER　　　　　2,822,893
DEVICE FOR TAKING UP BACKLASH
Filed Oct. 17, 1955　　　　　　　　　　　　　4 Sheets-Sheet 4

INVENTOR
JOSEPH FLUELER
BY Wenderoth, Lind & Ponack
Attys.

United States Patent Office 2,822,893
Patented Feb. 11, 1958

2,822,893

DEVICE FOR TAKING UP BACKLASH

Joseph Flueler, Lausanne, Switzerland

Application October 17, 1955, Serial No. 540,851

3 Claims. (Cl. 188—196)

The object of the present invention is a device for taking up slack between members such as in braking devices and the like which are movable between a position of rest and an active position.

The present device can be used in a vehicle brake of the drum type, in order to enable the slack between the drum and the brake shoes to be taken up when this slack increases due to the wear of the lining of the shoes. It can also be employed to take up any slack which may occur between the brake itself and its actuating lever.

The accompanying drawing illustrates, by way of example, two embodiments of the device constituting the object of the invention and shows how the device may be used with various types of brakes.

Fig. 1 is a cross-section of the first embodiment.

Fig. 1a is a cross-section along line 1a—1a of Fig. 1.

Fig. 1b is a view similar to that of Fig. 1 in which the device is shown in the adjusting position.

Fig. 2 is a cross-section of the second embodiment.

Fig. 2a is a cross-section along 2a—2a of Fig. 2.

Fig. 3 shows the use of the device on a hand brake.

Figure 4:
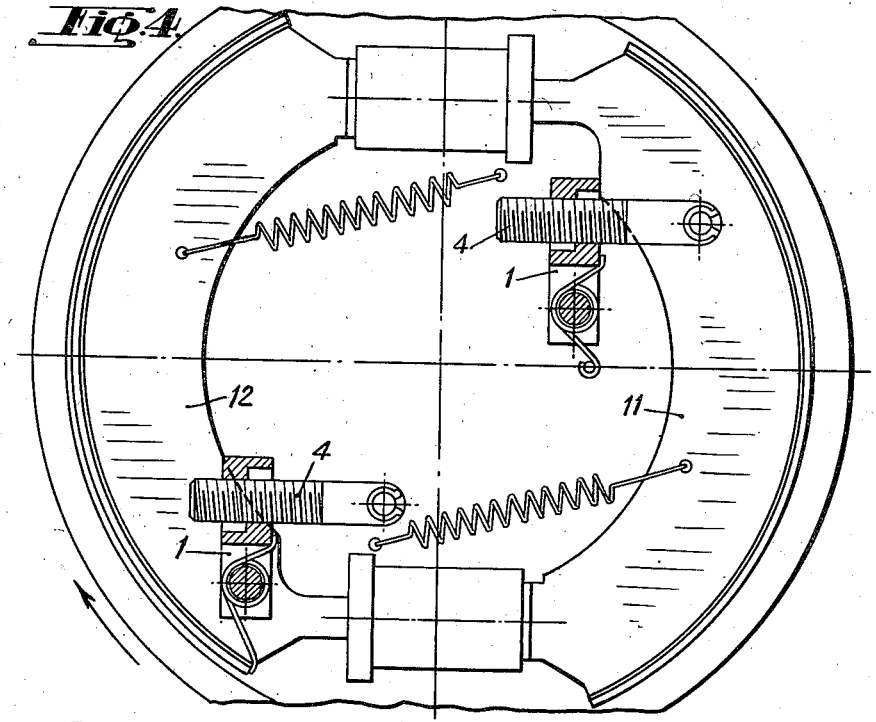
Fig. 4 shows the use of two identical devices on a hydraulic brake.

The device illustrated in Fig. 1 comprises a first component 1 provided with a hole which has internally directed sets of teeth 2 and 3 in two opposed portions thereof which are longitudinally staggered in relation to one another, between which opposed sets of teeth passes the second component of the device constituted by a rod 4 having tooth-like projections thereon in the form of a thread. Two longitudinally staggered and diametrically opposed parts 5 and 6 of the thread on the rod 4 have peripheral portions engaging with the ends of the sets of teeth 2 and 3 on the component 1. A spring 7 tends to cause the component 1 to rotate in a counter-clockwise direction in order to keep the ends of the teeth on the component 1 in engagement with the peripheral portion of the threads on the rod 4.

The embodiment illustrated in Fig. 2 differs from the first in the sense that the second component of the device is a flat rod having a substantially rectangular cross-section and there are two sets of teeth 8 and 9 arranged on the narrow sides of the cross-section. This device will be preferred to the first every time that the space available for fitting it is limited.

Fig. 3 shows how the device is fitted to the hand brake of a vehicle. This brake comprises a drum 10 secured to a wheel of the vehicle and rotating with it in the direction indicated by the arrow, cooperating with two pivoting shoes 11 and 12 for effecting the braking action, either when actuated by the hydraulic piston 13, or when actuated by a hand brake. The latter comprises an actuating cable 14 acting on a lever 15 maintained against the shoe 12 by a spring 16. The shoes 11 and 12 are normally maintained at a distance from the drum 10 by a return motion spring 17. This kind of construction is well known.

The component 1 of the device for taking up backlash is pivotally mounted on the shoe 11. The threaded rod 4 is secured to the lever 15 of the hand brake on which it is pivotally mounted. When the brake is at rest, the shoes being at a distance from the drum, the teeth 2 and 3 of the component 1 respectively engage with the threaded portions 5 and 6 of the threaded rod 4 under the action of the spring 7. When the brake is put on, the shoes being in contact with the drum, the relative motion of the two components 1 and 4 causes the component 1 to tilt. The teeth 2 and thread part 5 cease to mesh, while the teeth 3 of the component 1 remains in mesh with the thread part 6 of the rod 4 under the action of the spring 7. If the brake is adjusted in such a manner that when it is at rest there is a normal clearance between the shoes and the drum, the application of the brake will only produce a slight motion of the rod 4 in relation to the component 1. When the brake is released, the shoes return to their position of rest and the teeth 2 and thread part 5 mesh again in the same relative position as that occupied before the brake was applied. On the other hand, if, due to excessive wear of the linings of the shoes, the clearance between the latter and the drum exceeds the permissible value for the position of rest, the shoes will have to effect a larger movement in order to come into contact with the drum, entailing a larger relative motion of the component 1 and of the rod 4. The teeth 2 of the component 1 and the thread part 5 of the rod therefore move in relation to one another for a certain number of teeth. When the brake returns to rest, the teeth 2 and threaded part 5 mesh anew, but are now longitudinally moved in relation to one another relative to their previous position. The component 1 has therefore moved nearer to the free end of the rod 4, thus increasing the active length of the latter between the two jaws. The latter are thus farther apart after the brake has been put on than before, which amounts to saying that they are now nearer to the drum and that the clearance has thus been brought down to a normal value.

Fig. 4 illustrates a hydraulic drum brake comprising two shoes 11 and 12 each actuated by a hydraulic piston against the action of a return motion spring. Each shoe is provided with its device for taking up slack, the component 1 of which is pivotally mounted on a fixed support of the brake, and the rod 4 of which is secured to the shoe.

Figure 5:
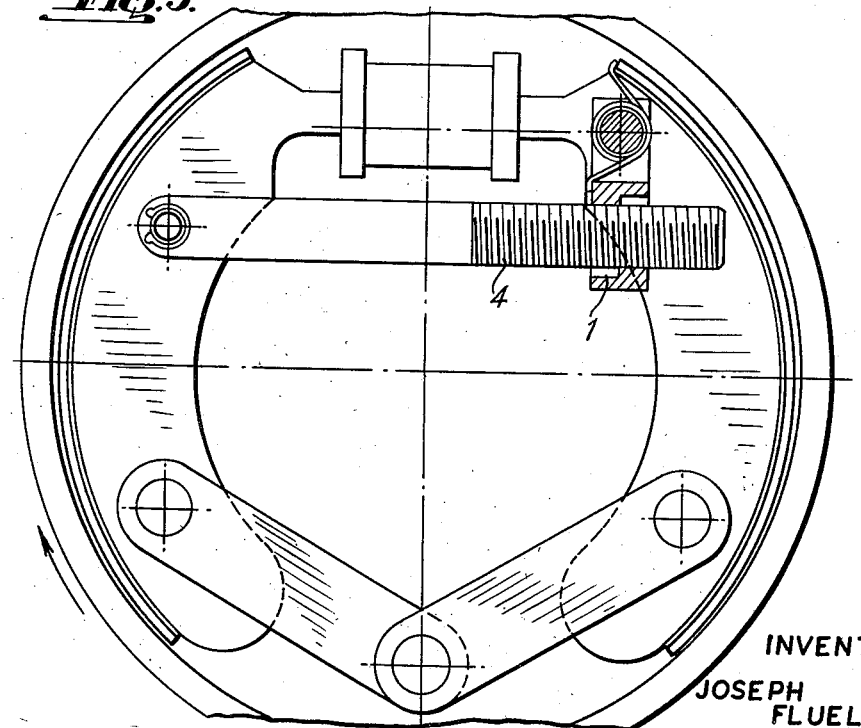
Fig. 5 shows the device on another type of hydraulic brake.

Fig. 5 shows a hydraulic brake provided with a device for taking up slack, the two components of which, the component 1 and the rod 4, are each secured to one of the shoes of the brake.

Figure 6:
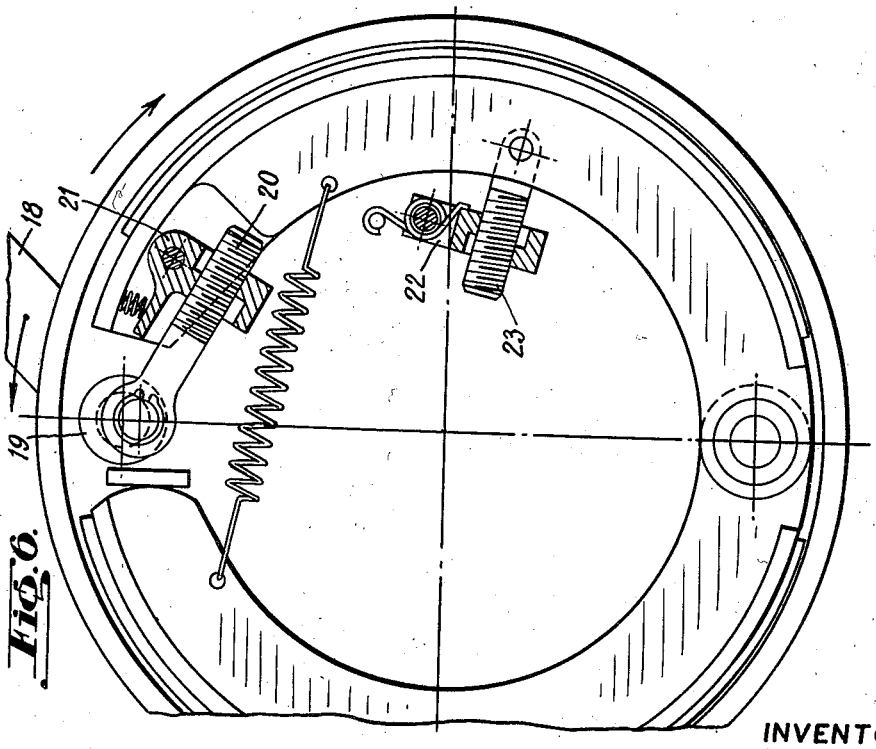
Fig. 6 shows two similar devices on a mechanical brake for vehicles moving in the forward direction only, one of the devices serving to take up slack between the shoes and the drum, and the other to take up slack between the actuating lever and the brake.

Fig. 6 illustrates a mechanical brake for vehicles moving in the forward direction only, and provided with two shoes which are articulated one to the other. The braking action is ensured by an actuating lever 18 which is secured, for instance, to a brake pedal and acts on an eccentric 19 which controls a threaded rod 20 cooperating with a component 21 secured to a brake shoe. The brake is fitted with a device for taking up slack between the shoes and the drum, constituted by a component 22 pivotally mounted on the fixed support of the brake and a threaded rod 23 secured to one of the shoes of the brake. The device 20, 21 functions in the same manner as the device 22, 23, but it is to take up any slack occurring between the lever 18 and the brake itself. In this manner the travel of the actuating lever 18 always remains practically the same. If this motion tended to increase, for instance due to wear of the stop of the brake pedal, the component 21 and the rod 22 would move relative to one another in order to take up the slack.

Figure 7:
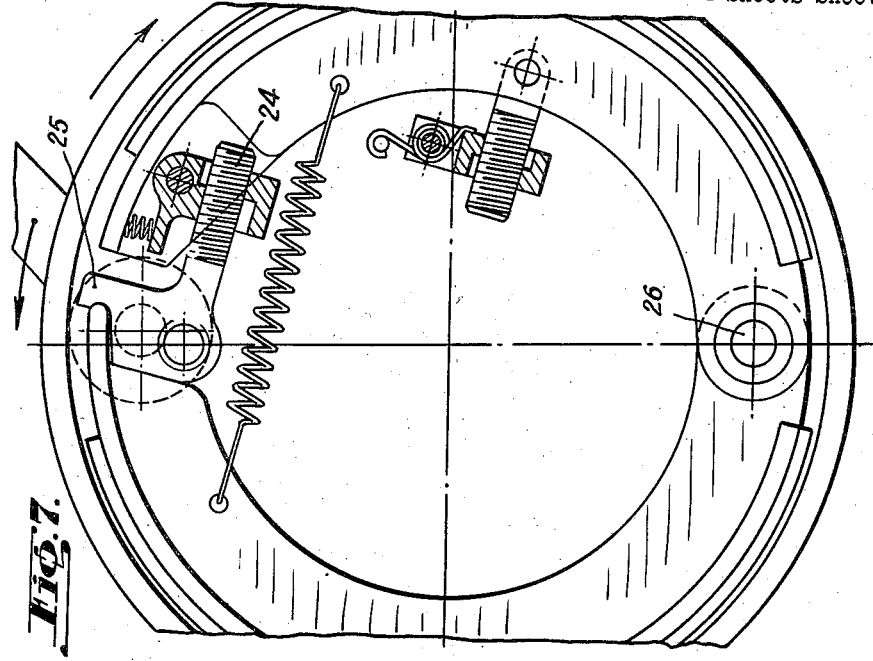
Fig. 7 shows the devices of Fig. 6 fitted to a mechanical brake for vehicles with both forward and backward motion.

Fig. 7 illustrates a two-shoe mechanical brake for vehicles with both forward and backward motion, which, like the brake shown in Fig. 6 is fitted with the two devices respectively destined to take up the slack between the shoes and the drum and the slack between the actuating lever and the brake itself. In this embodiment the actuating lever acts on one of the shoes by means of a threaded rod 24 and on the other by means of a cam 25. The shoes can either be articulated one on the other in 26 or mounted at this point on a common pivot secured to the support of the brake. The bearing carrying the eccentric shaft can be moved on the brake support, in order to enable the position of the cam 25 in relation to the corresponding shoe to be adjusted.

The expression "threaded rod" must be taken in the broadest sense, which means that it may also be applied to the case of non-helicoidal threads, formed for instance by ridges in a plane perpendicular to the axis of the rod.

What I claim is:

1. A device for taking up slack between two members movable relative to each other such as a brake shoe and a brake drum, said device comprising a rod adapted to be connected to one of said members, a plurality of tooth-like projections on diametrically opposed sides of said rod, a hollow member adapted to be pivoted to the other of said members, two sets of internally directed teeth on opposed portions of said hollow member which are staggered with respect to each other in the longitudinal direction of said hollow member, said rod extending through said hollow member with the ends of said sets of teeth engageable with the ends of said tooth-like projections, and spring means on said hollow member for urging said hollow member to a position where the ends of said sets of teeth are engaged with the ends of said tooth-like projections.

2. A device as claimed in claim 1 in which said rod is round in cross-section and said tooth-like projections are formed by a thread on said rod.

3. A device as claimed in claim 1 in which said rod is rectangular in cross-section and said tooth-like projections are on opposed short sides of the rectangular cross-section.

References Cited in the file of this patent
UNITED STATES PATENTS 2,512,369    Norris ------------------ June 20, 1950